United States Patent
Chitilian et al.

(10) Patent No.: US 10,460,317 B2
(45) Date of Patent: Oct. 29, 2019

(54) HANDS-FREE TRANSACTION TOKENS VIA PAYMENT PROCESSOR

(71) Applicant: GOOGLE INC., Mountain View, CA (US)

(72) Inventors: Varouj Chitilian, Hillsborough, CA (US); Sashikanth Chandrasekaran, Belmont, CA (US); Johnie Lee, Mountain View, CA (US); Thai Ngoc Duong, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 427 days.

(21) Appl. No.: 14/540,001

(22) Filed: Nov. 12, 2014

(65) Prior Publication Data

US 2016/0012420 A1 Jan. 14, 2016

Related U.S. Application Data

(60) Provisional application No. 62/023,739, filed on Jul. 11, 2014.

(51) Int. Cl.
*G06Q 20/40* (2012.01)
*G06Q 20/32* (2012.01)
(Continued)

(52) U.S. Cl.
CPC ......... *G06Q 20/401* (2013.01); *G06Q 20/322* (2013.01); *G06Q 20/3224* (2013.01);
(Continued)

(58) Field of Classification Search
CPC .................. G06F 21/33; G06Q 20/00–20/425
See application file for complete search history.

(56) References Cited

U.S. PATENT DOCUMENTS

| 5,280,527 A | 1/1994 | Gullman et al. |
| 6,185,545 B1 | 2/2001 | Resnick et al. |

(Continued)

FOREIGN PATENT DOCUMENTS

| EP | 1 246 144 A2 | 10/2002 |
| JP | 2006139476 A | 6/2006 |

(Continued)

OTHER PUBLICATIONS

Getachew, "U.S. Office Action issued in copending U.S. Appl. No. 14/540,034, filed Nov. 12, 2014", dated Jun. 23, 2017, 15 pages.
(Continued)

*Primary Examiner* — Calvin L Hewitt, II
*Assistant Examiner* — Zehra Raza
(74) *Attorney, Agent, or Firm* — Johnson, Marcou & Isaacs, LLC

(57) ABSTRACT

Conducting hands-free transactions comprises a server at a payment processing system, a user computing device, and a merchant computing device. The payment processing system registers a merchant system as a hands-free payment participant and provides a beacon identifier. The payment processing system receives a communication from a hands-free payment application on a user computing device, the communication comprising a transaction token, an identification of a user account, and the beacon identifier received by the user computing device via a wireless communication from a device associated with the merchant system and transmits the transaction token to the merchant system computing device. The payment processing system receives from the merchant system computing device, a transaction request, the transaction request comprising the token and transaction data associated with the transaction request and conducts the transaction between the user account and the
(Continued)

merchant system based on the received token and transaction request.

4 Claims, 8 Drawing Sheets

(51) Int. Cl.
    *G06Q 20/38*     (2012.01)
    *G06Q 20/36*     (2012.01)

(52) U.S. Cl.
    CPC ..... *G06Q 20/3227* (2013.01); *G06Q 20/3278* (2013.01); *G06Q 20/3674* (2013.01); *G06Q 20/382* (2013.01); *G06Q 20/3821* (2013.01); *G06Q 20/38215* (2013.01); *G06Q 20/4014* (2013.01); *G06Q 20/4016* (2013.01); *G06Q 2220/00* (2013.01)

(56) References Cited

U.S. PATENT DOCUMENTS

| | | | |
|---|---|---|---|
| 6,230,148 B1 | 5/2001 | Pare, Jr. et al. | |
| 6,601,762 B2 | 8/2003 | Piotrowski | |
| 6,766,306 B1 | 7/2004 | Matsuyama | |
| 6,783,459 B2 | 8/2004 | Cumbers | |
| 6,847,953 B2 * | 1/2005 | Kuo | G06Q 20/02 705/1.1 |
| 6,934,381 B1 | 8/2005 | Klein et al. | |
| 7,665,657 B2 | 2/2010 | Huh | |
| 7,761,381 B1 | 7/2010 | Fitch et al. | |
| 8,254,647 B1 | 8/2012 | Nechyba et al. | |
| 8,396,809 B1 | 3/2013 | Raff et al. | |
| 8,558,663 B2 | 10/2013 | Newman et al. | |
| 8,694,352 B1 | 4/2014 | Hawkins et al. | |
| 8,694,792 B2 | 4/2014 | Whillock | |
| 8,768,838 B1 | 7/2014 | Hoffman | |
| 8,793,509 B1 | 7/2014 | Nelson et al. | |
| 8,930,274 B1 | 1/2015 | Brickell et al. | |
| 9,229,623 B1 | 1/2016 | Penilla et al. | |
| 9,264,850 B1 | 2/2016 | Lee | |
| 9,373,112 B1 | 6/2016 | Henderson et al. | |
| 9,519,901 B1 | 12/2016 | Dorogusker | |
| 9,619,803 B2 | 4/2017 | Chandrasekaran et al. | |
| 9,652,791 B1 | 5/2017 | Brock | |
| 9,665,858 B1 | 5/2017 | Kumar | |
| 9,747,587 B2 | 8/2017 | Diehl | |
| 9,760,905 B2 | 9/2017 | Yoder et al. | |
| 9,770,206 B2 | 9/2017 | Ashokan | |
| 9,805,366 B1 | 10/2017 | Wilson et al. | |
| 9,881,303 B2 | 1/2018 | Vohra et al. | |
| 9,972,004 B1 | 5/2018 | Donavalli et al. | |
| 10,185,958 B2 | 1/2019 | Henderson et al. | |
| 2001/0013545 A1 | 8/2001 | Hogan | |
| 2001/0034724 A1 | 10/2001 | Thieme | |
| 2001/0044744 A1 | 11/2001 | Rhoads et al. | |
| 2002/0026575 A1 | 2/2002 | Wheeler et al. | |
| 2002/0132663 A1 | 9/2002 | Cumbers | |
| 2002/0164022 A1 | 11/2002 | Strasser et al. | |
| 2003/0028481 A1 | 2/2003 | Flitcroft et al. | |
| 2003/0149661 A1 | 8/2003 | Mitchell et al. | |
| 2004/0039692 A1 | 2/2004 | Shields et al. | |
| 2004/0117625 A1 | 6/2004 | Grawrock | |
| 2005/0129286 A1 | 6/2005 | Hekimian | |
| 2005/0165667 A1 | 7/2005 | Cox | |
| 2005/0246293 A1 | 11/2005 | Ong | |
| 2006/0056662 A1 | 3/2006 | Thieme et al. | |
| 2006/0203776 A1 | 9/2006 | Persaud et al. | |
| 2006/0235761 A1 * | 10/2006 | Johnson | G06Q 20/02 705/26.1 |
| 2007/0084913 A1 | 4/2007 | Weston | |
| 2007/0183634 A1 | 8/2007 | Dussich et al. | |
| 2007/0203999 A1 | 8/2007 | Townsley et al. | |
| 2008/0169903 A1 | 7/2008 | Fein et al. | |
| 2009/0005987 A1 | 1/2009 | Vengroff et al. | |
| 2009/0018924 A1 | 1/2009 | Roberts | |
| 2009/0140838 A1 | 6/2009 | Newman et al. | |
| 2009/0292641 A1 | 11/2009 | Weiss | |
| 2009/0313129 A1 | 12/2009 | Rothschild | |
| 2009/0325606 A1 | 12/2009 | Farris | |
| 2009/0327133 A1 | 12/2009 | Aharoni et al. | |
| 2010/0084462 A1 | 4/2010 | Scipioni et al. | |
| 2010/0114776 A1 | 5/2010 | Weller et al. | |
| 2010/0211966 A1 | 8/2010 | Zhang et al. | |
| 2011/0047045 A1 | 2/2011 | Brody et al. | |
| 2011/0161233 A1 | 6/2011 | Tieken | |
| 2011/0178883 A1 | 7/2011 | Granbery | |
| 2011/0190055 A1 | 8/2011 | Leyvand et al. | |
| 2011/0258122 A1 | 10/2011 | Shader et al. | |
| 2011/0264543 A1 | 10/2011 | Taveau et al. | |
| 2011/0257985 A1 | 11/2011 | Goldstein | |
| 2011/0295707 A1 | 12/2011 | Gui et al. | |
| 2011/0307403 A1 | 12/2011 | Rostampour et al. | |
| 2012/0030006 A1 | 2/2012 | Yoder et al. | |
| 2012/0115512 A1 | 5/2012 | Grainger et al. | |
| 2012/0166314 A1 | 6/2012 | Kimberg | |
| 2012/0213420 A1 | 8/2012 | Steiner | |
| 2012/0257797 A1 | 10/2012 | Leyvand et al. | |
| 2012/0284193 A1 | 11/2012 | Bharghavan | |
| 2012/0316953 A1 | 12/2012 | Ramchandani et al. | |
| 2013/0006784 A1 | 1/2013 | Krauss et al. | |
| 2013/0006810 A1 | 1/2013 | Elias | |
| 2013/0024308 A1 | 1/2013 | Ramaswamy et al. | |
| 2013/0031006 A1 | 1/2013 | McCullagh et al. | |
| 2013/0035979 A1 | 2/2013 | Tenbrock | |
| 2013/0132274 A1 | 5/2013 | Henderson et al. | |
| 2013/0134215 A1 | 5/2013 | Ramachandran et al. | |
| 2013/0226791 A1 | 8/2013 | Springer et al. | |
| 2013/0226800 A1 | 8/2013 | Patel et al. | |
| 2013/0275247 A1 | 10/2013 | Ramaratnam et al. | |
| 2013/0282502 A1 | 10/2013 | Jooste | |
| 2013/0282582 A1 | 10/2013 | Pereira et al. | |
| 2013/0297730 A1 | 11/2013 | Zhang et al. | |
| 2013/0346201 A1 | 12/2013 | Bilange | |
| 2014/0006123 A1 | 1/2014 | Kepecs | |
| 2014/0032415 A1 | 1/2014 | Lee | |
| 2014/0040051 A1 | 2/2014 | Ovick et al. | |
| 2014/0040125 A1 | 2/2014 | Kunz et al. | |
| 2014/0040135 A1 | 2/2014 | Ovick et al. | |
| 2014/0040139 A1 | 2/2014 | Brudnicki et al. | |
| 2014/0053255 A1 | 2/2014 | Lindteigen et al. | |
| 2014/0067649 A1 | 3/2014 | Kannan et al. | |
| 2014/0067679 A1 | 3/2014 | O'reilly et al. | |
| 2014/0074709 A1 | 3/2014 | Green et al. | |
| 2014/0086590 A1 | 3/2014 | Ganick et al. | |
| 2014/0164254 A1 | 6/2014 | Dimmick | |
| 2014/0165187 A1 | 6/2014 | Daesung et al. | |
| 2014/0189808 A1 | 7/2014 | Mahaffey et al. | |
| 2014/0201080 A1 | 7/2014 | Just | |
| 2014/0222596 A1 | 8/2014 | S | |
| 2014/0227999 A1 | 8/2014 | Ferlin | |
| 2014/0237587 A1 | 8/2014 | Forbes et al. | |
| 2014/0279458 A1 | 9/2014 | Holman et al. | |
| 2014/0330659 A1 | 11/2014 | Yopp et al. | |
| 2014/0351072 A1 | 11/2014 | Wieler et al. | |
| 2014/0351132 A1 | 11/2014 | Wieler et al. | |
| 2014/0372128 A1 | 12/2014 | Sheets et al. | |
| 2015/0006271 A1 | 1/2015 | Oppenheim et al. | |
| 2015/0012418 A1 | 1/2015 | Chu | |
| 2015/0013003 A1 | 1/2015 | Osterlund et al. | |
| 2015/0046990 A1 | 2/2015 | Oberheide et al. | |
| 2015/0066671 A1 | 3/2015 | Nichols et al. | |
| 2015/0079942 A1 | 3/2015 | Kostka et al. | |
| 2015/0081550 A1 | 3/2015 | Priebatsch et al. | |
| 2015/0106216 A1 | 4/2015 | Kenderov | |
| 2015/0120473 A1 | 4/2015 | Jung et al. | |
| 2015/0161417 A1 | 6/2015 | Kaplan et al. | |
| 2015/0170145 A1 | 6/2015 | Patel et al. | |
| 2015/0181384 A1 | 6/2015 | Mayor et al. | |
| 2015/0186871 A1 | 7/2015 | Laracey | |
| 2015/0261787 A1 | 9/2015 | Hu et al. | |
| 2015/0269583 A1 | 9/2015 | Taylor et al. | |
| 2015/0302412 A1 | 10/2015 | Bhanoo | |
| 2015/0309569 A1 | 10/2015 | Kohlhoff et al. | |

(56) References Cited

U.S. PATENT DOCUMENTS

| | | |
|---|---|---|
| 2015/0356563 A1 | 12/2015 | Vohra et al. |
| 2015/0371234 A1 | 12/2015 | Huang et al. |
| 2015/0373762 A1 | 12/2015 | Raj et al. |
| 2015/0379506 A1 | 12/2015 | Griffin |
| 2015/0379650 A1* | 12/2015 | Theobald ............... G06Q 50/12 705/15 |
| 2016/0012413 A1 | 1/2016 | Chitilian et al. |
| 2016/0012414 A1 | 1/2016 | Chitilian et al. |
| 2016/0012421 A1 | 1/2016 | Chitilian et al. |
| 2016/0012422 A1 | 1/2016 | Chitilian et al. |
| 2016/0012423 A1 | 1/2016 | Chitilian et al. |
| 2016/0012426 A1 | 1/2016 | Chitilian et al. |
| 2016/0012428 A1 | 1/2016 | Haldenby et al. |
| 2016/0012430 A1 | 1/2016 | Chandrasekaran et al. |
| 2016/0019547 A1 | 1/2016 | Gurnani et al. |
| 2016/0042346 A1 | 2/2016 | Pastore et al. |
| 2016/0048846 A1 | 2/2016 | Douglas et al. |
| 2016/0063435 A1 | 3/2016 | Shah et al. |
| 2016/0063459 A1 | 3/2016 | Li et al. |
| 2016/0321633 A1 | 11/2016 | Chandrasekaran et al. |
| 2016/0321671 A1 | 11/2016 | Chandrasekaran et al. |
| 2016/0323274 A1 | 11/2016 | Chandrasekaran et al. |
| 2016/0342967 A1 | 11/2016 | Proctor et al. |
| 2016/0353274 A1 | 12/2016 | Chichierchia |
| 2016/0364701 A1 | 12/2016 | Nayfack |
| 2017/0024731 A1 | 1/2017 | Gullett et al. |
| 2017/0053276 A1 | 2/2017 | Gullett et al. |
| 2017/0091765 A1 | 3/2017 | Lloyd et al. |
| 2017/0116589 A1 | 4/2017 | Krishnaiah |
| 2017/0193480 A1 | 7/2017 | Chandrasekaran et al. |
| 2017/0221065 A1 | 8/2017 | Chitilian et al. |
| 2017/0255923 A1 | 9/2017 | Dieter et al. |
| 2017/0255941 A1 | 9/2017 | Chandrasekaran et al. |
| 2017/0255942 A1 | 9/2017 | Chandrasekaran et al. |
| 2017/0300957 A1 | 10/2017 | Yoder et al. |
| 2017/0323299 A1 | 11/2017 | Davis |
| 2017/0364901 A1 | 12/2017 | Chandrasekaran et al. |
| 2018/0032798 A1 | 2/2018 | Setchell |
| 2019/0130408 A1 | 5/2019 | Chitilian et al. |
| 2019/0266598 A1 | 8/2019 | Chitilian et al. |

FOREIGN PATENT DOCUMENTS

| | | |
|---|---|---|
| JP | 2011-014174 A | 1/2011 |
| JP | 2014-099156 A | 5/2014 |
| JP | 2014-191416 A | 10/2014 |
| JP | 2016-024758 A | 2/2016 |
| KR | 10-2012-0011776 A | 2/2012 |
| KR | 10-1242390 B1 | 3/2013 |
| KR | 10-2015-0003922 A | 1/2015 |
| KR | 10-2015-0011046 A | 1/2015 |
| WO | 02099758 A1 | 12/2002 |
| WO | 2005/031663 A2 | 4/2005 |
| WO | 2008/101142 A1 | 8/2008 |
| WO | 2014/092233 A1 | 6/2014 |
| WO | 2014130222 A1 | 8/2014 |
| WO | 2014/182787 A2 | 11/2014 |
| WO | 2015/072191 A1 | 5/2015 |
| WO | 2016/007445 A1 | 1/2016 |
| WO | 2016/007801 A1 | 1/2016 |
| WO | 2016/007934 A1 | 1/2016 |
| WO | 2016/007445 A8 | 3/2016 |
| WO | 2016/033468 A1 | 3/2016 |
| WO | 2017/151700 A1 | 9/2017 |
| WO | 2017/151815 A1 | 9/2017 |
| WO | 2017/151825 A1 | 9/2017 |
| WO | 2017/222837 A1 | 12/2017 |
| WO | 2018/026688 A1 | 2/2018 |

OTHER PUBLICATIONS

Getachew, "U.S. Office Action issued in copending U.S. Appl. No. 14/540,036, filed Nov. 12, 2014", dated Jun. 16, 2017, 16 pages.

Raza, "U.S. Office Action issued in copending U.S. Appl. No. 14/540,004, filed Nov. 12, 2014", dated Jun. 21, 2017, 17 pages.

Reichert, "International Search Report and Written Opinion issued in International Application No. PCT/US2017/020291", dated May 9, 2017, 14 pages.

Toscano Oliveros, "International Search Report and Written Opinion issued in International Application No. PCT/US2017/020270", dated May 9, 2017, 13 pages.

U.S. Appl. No. 15/447,083 to Chandrasekaran et al. filed Mar. 1, 2017.

U.S. Appl. No. 15/446,990 to Chandrasekaran et al. filed Mar. 1, 2017.

U.S. Appl. No. 15/446,734 to Dieter et al. filed Mar. 1, 2017.

U.S. Appl. No. 15/492,718 to Chitilian et al. filed Apr. 20, 2017.

Winter, "U.S. Office Action issued in copending U.S. Appl. No. 14/539,997, filed Nov. 12, 2014", dated Dec. 31, 2015, 15 pages.

Winter, "U.S. Office Action issued in copending U.S. Appl. No. 14/539,997, filed Nov. 12, 2014", dated Jun. 30, 2016, 16 pages.

Thomas, "International Search Report and Written Opinion issued in International Application No. PCT/US2017/020078", dated May 25, 2017, 10 pages.

Nickitas-Etienne, "International Preliminary Report on Patentability issued in International Application No. PCT/US2015/039275", dated Jan. 26, 2017, 9 pages.

Wittmann-Regis, "International Preliminary Report on Patentability issued in International Application No. PCT/US2015/039836", dated Jan. 26, 2017, 8 pages.

Baharlou, "International Preliminary Report on Patentability issued in International Application No. PCT/US2015/040067", dated Jan. 26, 2017, 7 pages.

Berthon, "International Search Report and Written Opinion issued in International Application No. PCT/US2015/039836", dated Jul. 10, 2015, 1-10.

Berthon, "International Search Report and Written Opinion issued in International Application No. PCT/US2015/040067", dated Oct. 26, 2015, 1-8.

Peuser, "International Search Report and Written Opinion issued in International Application No. PCT/US2015/039275", dated Oct. 8, 2015, 1-11.

Unknown, "Beacon Paypal", Retrieved from the internet—url: http://www.paypal.com/webapps/mpp/beacon, Jul. 17, 2014, 1-6.

Unknown, "Paypal Debuts its Newest Hardward, Beacon, A Bluetooth LE Enabled Device for Hands-Free Check Ins and Payments", Retrieved from the Internet—URL—http://techcrunch.com/2013/09/09 palpal-debuts-its-newest-hardware-beacon-a-bluetooth-le-enabled-device-for-hands-free-check-ins-and-payments, Sep. 9, 2013, 1-29.

Winter, "Office Action issued in copending U.S. Appl. No. 14/539,997, filed Nov. 12, 2014", dated Jun. 17, 2015, 1-11.

U.S. Appl. No. 14/539,997 to Chitilian et al. filed Nov. 12, 2014.

U.S. Appl. No. 14/540,004 to Chitilian et al. filed Nov. 12, 2014.

U.S. Appl. No. 14/540,009 to Chitilian filed Nov. 12, 2014.

U.S. Appl. No. 14/540,031 to Chitilian et al. filed Nov. 12, 2014.

U.S. Appl. No. 14/540,034 to Chitilian et al. filed Nov. 12, 2014.

U.S. Appl. No. 14/540,036 to Chitilian et al. filed Nov. 12, 2014.

McCoy, "U.S. Office Action issued in copending U.S. Appl. No. 15/447,083, filed Mar. 1, 2017", dated Dec. 6, 2017, 14 pages.

Raza, "U.S. Office Action issued in copending U.S. Appl. No. 14/540,009, filed Nov. 12, 2014", dated Sep. 7, 2017, 15 pages.

Getachew, "U.S. Office Action issued in copending U.S. Appl. No. 14/540,034, filed Nov. 12, 2014", dated Dec. 19, 2017, 26 pages.

Getachew, "U.S. Office Action issued in copending U.S. Appl. No. 14/540,036, filed Nov. 12, 2014", dated Dec. 19, 2017, 24 pages.

Raza, "U.S. Office Action issued in copending U.S. Appl. No. 14/540,004, filed Nov. 12, 2014", dated Dec. 26, 2017, 17 pages.

Berthon, "International Search Report and Written Opinion issued in International Application No. PCT/US2017/036883", dated Sep. 18, 2017, 13 pages.

Lander, "United Kingdom Office Action received for United Kingdom Patent Application No. 1709634.8", dated Nov. 16, 2017, 8 pages.

Raza, "U.S. Office Action issued in copending U.S. Appl. No. 14/540,031, filed Nov. 12, 2014", dated Nov. 24, 2017, 19 pages.

(56) References Cited

OTHER PUBLICATIONS

Van Praagh, "International Search Report and Written Opinion issued in International Application No. PCT/US2017/044603", dated Nov. 8, 2017, 12 pages.
U.S. Appl. No. 15/616,895 to Chandrasekaran, et al. filed Jun. 7, 2017.
U.S. Appl. No. 15/664,640 to William Setchell filed Jul. 31, 2017.
Gottschalk, "U.S. Office Action issued in copending U.S. Appl. No. 14/797,029, filed Jul. 10, 2015", dated Apr. 9, 2018, 13 Pages.
Raza, "U.S. Office Action issued in copending U.S. Appl. No. 14/540,009, filed Nov. 12, 2014", dated Jan. 9, 2018, 16 pages.
Raza, "U.S. Office Action issued in copending U.S. Appl. No. 14/540,004, filed Nov. 12, 2014", dated May 3, 2018, 15 pages.
McCoy, "U.S. Office Action issued in copending U.S. Appl. No. 15/447,083, filed Mar. 1, 2017", dated Jun. 22, 2018, 17 pages.
Raza, "U.S. Office Action issued in copending U.S. Appl. No. 14/540,031, filed Nov. 12, 2014", dated Jun. 13, 2018, 19 pages.
Wodajo "U.S. Office Action issued in copending U.S. Appl. No. 14/540,034, filed Nov. 12, 2014", dated Feb. 19, 2019 30 pages.
Raymaekers "European Office Action issued in European Application No. 15742466.4", dated Jan. 22, 2019, 11 pages.
Chang "U.S. Office Action issued in copending U.S. Appl. No. 15/664,640, filed Jul. 7, 2017", dated Feb. 5, 2019, 8 pages.
Winter, "U.S. Office Action issued in copending U.S. Appl. No. 15/492,718, filed Apr. 20, 2017", dated Nov. 27, 2018, 11 pages.
Raymaekers "European Office Action issued in European Application No. 15741455.8", dated Jan. 8, 2019, 14 pages.
U.S. Appl. No. 16/233,442 to Varouj Chitilian et al. filed Dec. 27, 2018.
U.S. Appl. No. 16/238,492 to Varouj Chitilian et al. filed Jan. 2, 2019.
Baharlou, "International Preliminary Report on Patentability issued in International Application No. PCT/US2017/020270", dated Sep. 13, 2018, 8 pages.
Nickitas-Etienne, "International Preliminary Report on Patentability issued in International Application No. PCT/US2017/020078", dated Sep. 13, 2018, 9 pages.
Nickitas-Etienne, "International Preliminary Report on Patentability issued in International Application No. PCT/US2017/020291", dated Sep. 13, 2018, 8 pages.
Raza, "U.S. Office Action issued in copending U.S. Appl. No. 14/540,031, filed Nov. 12, 2014", dated Oct. 2, 2018, 17 pages.
Getachew, "U.S. Office Action issued in copending U.S. Appl. No. 14/540,034, filed Nov. 12, 2014", dated Jul. 25, 2018, 26 pages.
Getachew, "U.S. Office Action issued in copending U.S. Appl. No. 14/540,036, filed Nov. 12, 2014", dated Aug. 3, 2018, 18 pages.
McCoy, "U.S. Office Action issued in copending U.S. Appl. No. 15/447,083, filed Mar. 1, 2017", dated Nov. 2, 2018, 18 pages.
Gottschalk, "U.S. Office Action issued in copending U.S. Appl. No. 14/797,029, filed Jul. 10, 2015", dated Oct. 17, 2018, 14 pages.
Bartley "U.S. Office Action issued in copending U.S. Appl. No. 15/446,734, filed Mar. 1, 2017", dated Apr. 1, 2019, 35 pages.
Dega "U.S. Office Action issued in copending U.S. Appl. No. 15/446,990, filed Mar. 1, 2017", dated May 2, 2019, 16 pages.
Getachew "U.S. Office Action issued in copending U.S. Appl. No. 14/540,036, filed Nov. 12, 2014", dated Mar. 6, 2019, 23 pages.
McCoy "U.S. Office Action issued in copending U.S. Appl. No. 15/447,083, filed Mar. 1, 2017", dated Apr. 23, 2019, 16 pages.
Raza "U.S. Office Action issued in copending U.S. Appl. No. 14/540,004, filed Nov. 12, 2014", dated Mar. 25, 2019, 8 pages.
U.S. Appl. No. 16/407,133 to Chitilian et al. filed May 8, 2019.
Gottschalk "U.S. Office Action issued in copending U.S. Appl. No. 14/797,029, filed Jul. 10, 2015", dated Jun. 25, 2019, 16 pages.
Park "Korean Office Action issued in Korean Application No. 10-2018-701869", dated May 28, 2019, 7 pages of English Translation and 7 pages of Korean Office Action.
Winter "U.S. Office Action issued in co-pending U.S. Appl. No. 15/492,718, filed Apr. 20, 2017", dated Jun. 12, 2019, 11 pages.
Bartley "U.S. Office Action issued in copending U.S. Appl. No. 15/446,734, filed Mar. 1, 2017",dated Jul. 24, 2019, 51 pages.
Berlea "Extended European Search Report issued in European Application No. 17760676.1", dated Jul. 30, 2019, 8 pages.
Kaizuka "Japanese Office Action issued in Japanese Application No. 2018-531520", dated Aug. 5, 2019, 04 pages of English Translation and 03 pages Of Japanese Office Action.
Kaizuka "Japanese Office Action issued in Japanese Application No. 2018-536774", dated Aug. 5, 2019, 05 pages Of English Translation and 04 pages of Japanese Office Action.
Park "Korean Office Action issued in Korean Application No. 10-2018-7023338", dated Jul. 23, 2019, 7 pages of English Translation and 7 pages of Korean Office Action.
Shah "U.S. Office Action issued in copending U.S. Appl. No. 15/616,895, filed Jun. 7, 2017", dated Aug. 20, 2019, 27 pages.

* cited by examiner

440b

```
┌─────────────────────────────────────────────────┐
│  Method for a user computing device to recognize a beacon
│  via wireless communication at a location of a merchant
│  system and approve the merchant system using location
│                      data
└─────────────────────────────────────────────────┘
```

610

User device receives beacon

620

User device identifies beacon identifier

730

User device accesses list of approved beacon identifications and merchant system locations

740

User device determines location of user

750

User device determines if location of user device matches expected location of the merchant based on the location associated with the beacon identifier

760

User device determines that the beacon identifier is represented on the list of approved beacon identifications 230, Fig. 2

Figure 7

HANDS-FREE TRANSACTION TOKENS VIA PAYMENT PROCESSOR

RELATED APPLICATION

This patent application claims priority under 35 U.S.C. § 119 to U.S. Patent Application No. 62/023,739, filed Jul. 11, 2014 and entitled "Hands-Free Transactions." The entire contents of the above-identified application are hereby fully incorporated herein by reference.

TECHNICAL FIELD

The present disclosure relates generally to retail transactions, and more particularly to conducting hands-free transactions at a merchant location that allow a user to conduct transactions without engaging the user computing device. The disclosure additionally relates to making the transactions more secure and efficient.

BACKGROUND

When consumers make purchases at a merchant location, many methods of conducting a transaction are available. Consumers may use many different payment cards or accounts for purchases, such as gift cards, debit cards, credit cards, stored value cards, and other cards or accounts. The user account identifiers and other data represented by the cards may be communicated to the merchant system via magnetic stripes, near field communication technologies, manual input, and other suitable mechanisms.

Conventional payment systems require the consumer to perform actions to provide the user account identifiers and other data to the merchant system. For example, the user may be required to actuate a start button or initiate an application. In another example, the user may be required to tap or swipe a user computing device to initiate a transaction. Other user interactions may be required by conventional payment systems.

SUMMARY

Techniques herein provide computer-implemented methods to conduct hands-free transactions. In an example embodiment, conducting hands-free transactions comprises a server at a payment processing system, a user computing device, and a merchant computing device. The payment processing system registers a merchant system as a hands-free payment participant and provides a beacon identifier. The merchant system broadcasts the beacon, which is received by a user computing device at the merchant's location. The payment processing system receives a communication from a hands-free payment application on the user computing device. The communication comprises a transaction token, an identification of a user account, and the beacon identifier received by the user computing device and transmits the transaction token to the merchant system computing device. The payment processing system receives from the merchant system computing device, a transaction request. The transaction request comprises the token and transaction data associated with the transaction request. The payment processing system conducts the transaction between the user account and the merchant system based on the received token and transaction request.

In certain other example aspects described herein, systems and computer program products to conduct hands-free transactions are provided.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 7 is a block flow diagram depicting a method for a user computing device to recognize a beacon via wireless communication at a location of a merchant system and approve the merchant system using location data, in accordance with certain example embodiments.

DETAILED DESCRIPTION OF EXAMPLE EMBODIMENTS

Overview

Figure 1:
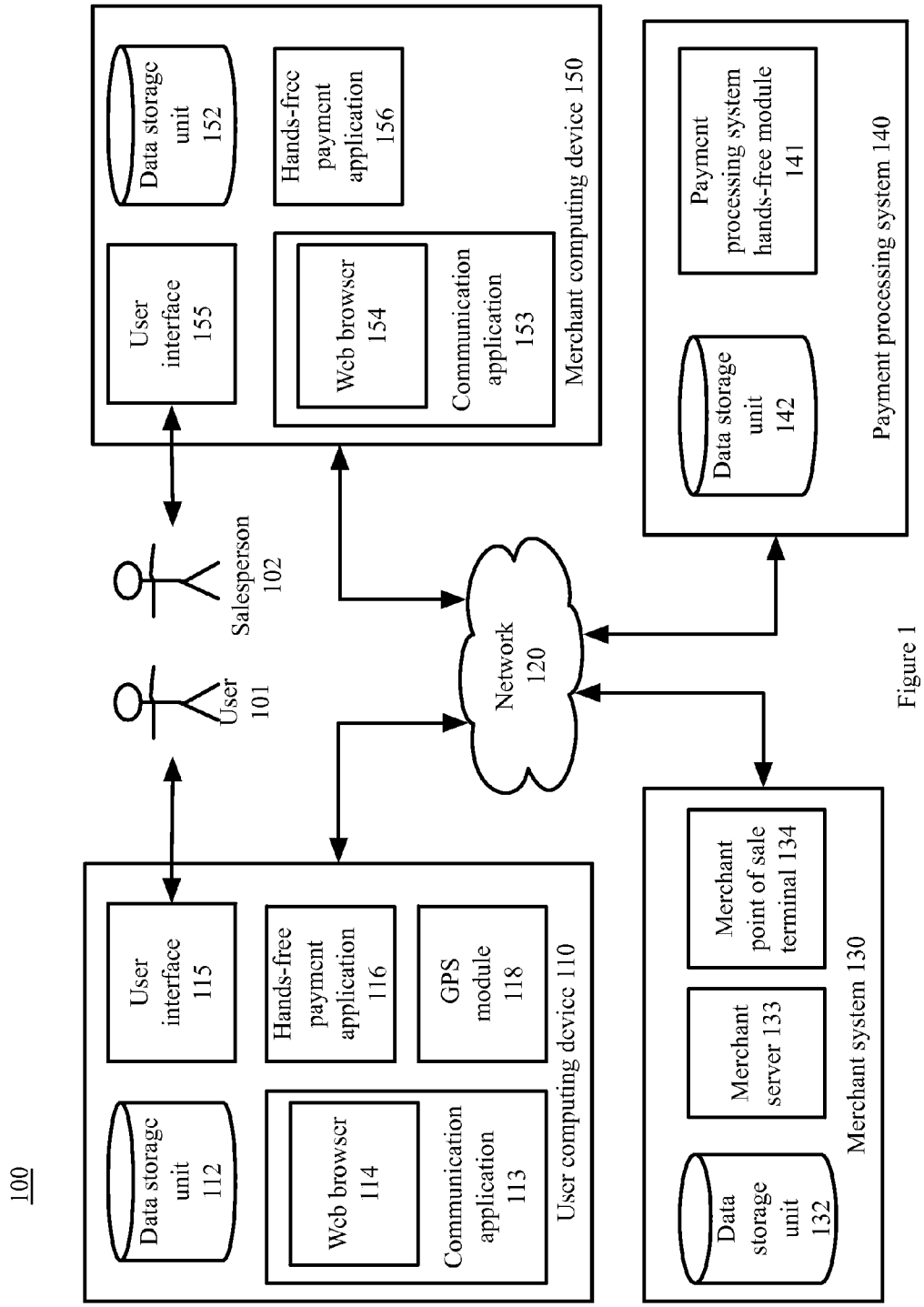
FIG. 1 is a block diagram depicting a system for conducting hands-free transactions, in accordance with certain example embodiments.

The example embodiments described herein provide computer-implemented techniques to conduct hands-free payments. In an example embodiment, a user installs a hands-free application on a user computing device. The user maintains a user account on a payment processing system for conducting transactions. A merchant computing device at a merchant location provides a beacon identifier that is received by the user computing device.

The user computing device generates a token for conducting a transaction and transmits the token to the payment processing system. The payment processing system transmits the token to the merchant computing device. The merchant computing device stores the token for use in a transaction with the user computing device.

The user approaches the salesperson to conduct a transaction using the hands-free application. The salesperson initiates the transaction on the merchant computing device and identifies the user on a user interface of the merchant computing device. The merchant computing device transmits the transaction details and the token for the user to the payment processing system. The payment processing system verifies the details of the transaction and the token and conducts the transaction. The payment processing system communicates a notification to the user computing device with the transaction data.

In an example embodiment, the beacon identifier of the merchant system and other authorized beacon identifiers are stored on a database. The user computing device compares a received beacon identifier to the database and determines if the merchant beacon is authorized for hands-free transactions with the user.

In another example embodiment, a global positioning system ("GPS") module of a user computing device is utilized to determine if the merchant beacon is authorized for hands-free transactions with the user. The user computing device, upon receiving a beacon identifier, determines the location of the user computing device, and thus, the location of the beacon. The location is compared to a database of beacon locations to determine if the beacon is broadcasting from the expected location. If the locations match, then the user computing device determines that a subsequent hands-free transaction with the merchant may proceed.

By using and relying on the methods and systems described herein, the hands-free application and payment processing system dynamically provide accurate and reliable transactions for a user without a needed action from the user. As such, the systems and methods described herein may be employed to allow the user to conduct a transaction using communications from the user computing device, the merchant computing device, and the payment processing system that are secure and efficient. The user is not troubled to provide any actuation or other initiating steps to conduct a transaction. The system may use the location of the user computing device to make the transaction more secure. The system may use communication between the user computing device and the payment processing system to reduce fraudulent activities by the merchant. The system may use beacon identifiers between the user computing device and the merchant computing device to reduce fraudulent activities. Hence, the methods and systems described herein decrease user frustration and permit accurate and reliable transactions for a user.

Example System Architectures

Turning now to the drawings, in which like numerals indicate like (but not necessarily identical) elements throughout the figures, example embodiments are described in detail.

FIG. 1 is a block diagram depicting a system 100 for conducting hands-free transactions, in accordance with certain example embodiments. As depicted in FIG. 1, the system 100 includes network computing devices 110, 130, 140, and 150 that are configured to communicate with one another via one or more networks 120. In some embodiments, a user 101 or a salesperson 102 associated with a device must install an application and/or make a feature selection to obtain the benefits of the techniques described herein.

In example embodiments, the network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, near field communication ("NFC"), Wi-Fi, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing system 110, 130, 140, and 150 includes a device having a communication module capable of transmitting and receiving data over the network 120. For example, each network computing device 110, 130, 140, and 150 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 130, 140, and 150 are operated by users 101, merchant system operators, payment processing system operators, and salespersons 102, respectively.

In the examples provided herein, actions performed by the user 101 may be performed by the salesperson 102 in other embodiments. Examples described as being performed by the user computing device 110 may be performed by the merchant computing device 150 or the payment processing system 140 in other embodiments.

An example user computing device 110 comprises a data storage unit 112, a communication application 113, a web browser 114, a user interface 115, a global positioning system ("GPS") module 118, and a hands-free payment application 116.

In an example embodiment, the data storage unit 112 comprises a local or remote data storage structure accessible to the user computing device 110 suitable for storing information. In an example embodiment, the data storage unit 112 stores encrypted information, such as HTML5 local storage.

In an example embodiment, the user 101 uses a communication application 113, such as a web browser 114 application or a stand-alone hands-free payment application 116, to view, download, upload, or otherwise access documents or web pages via a distributed network 120.

In an example embodiment, the communication application 113 can interact with web servers or other computing devices connected to the network 120, including the user computing device 110, a point of sale ("POS") terminal 134 associated with a merchant system 130 and/or a web server (not depicted) associated with a payment processing system 140.

In an example embodiment, the web browser 114 can enable the user 101 to interact with web pages using the user computing device 110.

In an example embodiment, the user interface 115 enables the user 101 to interact with the hands-free payment application 116 and/or web browser 114. For example, the user interface 115 may be a touch screen, a voice-based interface, or any other interface that allows the user 101 to provide input and receive output from an application or module on the user computing device 110. In an example embodiment, the user 101 interacts via the user interface 115 with the hands-free payment application 116 and/or web browser 114 to configure user accounts on a payment processing system hands-free module 141. In another example embodiment, the user 101 interacts via the user interface 115 with the hands-free payment application 116 and/or the web browser 114 to enable hands-free payments, if needed.

In an example embodiment, the GPS module 118 communicates with one or more satellites of the Global Positioning System ("GPS") or other satellite-based location system to determine the location of the user computing device 110. In an example embodiment, the delivery system 140 periodically or continuously communicates with the GPS module 118 during applicable time periods to determine and log the location of the user computing device 110. In another embodiment, the location of the user computing device 110 is identified based on Wi-Fi signals, cellular location, or any suitable location identifying technology. Any location determining hardware, software, or combination of hardware and software is represented by the GPS module 118.

In an example embodiment, the hands-free payment application 116 is a program, function, routine, applet, or similar entity that exists on and performs its operations on the user computing device 110. In certain example embodiments, the user 101 must install the hands-free payment application 116 and/or make a feature selection on the user computing device 110 to obtain the benefits of the techniques described herein. In an example embodiment, the user 101 may access the hands-free payment application 116 on the user computing device 110 via the user interface 115. In an example embodiment, the hands-free payment application 116 may be associated with the payment processing system 140. In another example embodiment, the application may be associated with the merchant system 130. In yet another example embodiment, there are two hands-free payment applications 116, one associated with the merchant system 130 and another associated with the payment processing system 140.

In certain example embodiments, one or more functions herein described as performed by the hands-free payment application 116 may also be performed by a web browser 114 application, for example, a web browser 114 application associated with a merchant system website 134 or associated with the payment processing system 140. In certain example embodiments, one or more functions herein described as performed by the hands-free payment application 116 may also be performed by the user computing device operating system. In certain example embodiments, one or more functions herein described as performed via the web browser 114 may also be performed via the hands-free payment application 116.

In an example embodiment, the user computing device 110 communicates with the merchant system 130 and the payment processing system 140 via the network 120.

An example merchant system 130 comprises a server 133, POS terminal 134, and a data storage unit 132. In an example embodiment, the merchant system 130 communicates with a payment processing system 140 over the network 120. In example embodiments described herein, the merchant system 130 is a separate entity from the payment processing system 140. However, in certain other example embodiments, the merchant system 130 is associated with a payment processing system 140, is a component of another system along with a payment processing system 140, comprises a payment processing system 140, or is a component of a payment processing system 140.

In an example embodiment, the data storage unit 132 comprises a local or remote data storage structure accessible to the merchant system 130 suitable for storing information. In an example embodiment, the data storage unit 132 stores encrypted information, such as HTML5 local storage.

In an example embodiment, the web server 133 provides content accessible by the user 101 through the web browser 114 and/or hands-free payment application 116 on the user computing device 110, including but not limited to html documents, images, style sheets, and scripts. In an example embodiment, the server 133 supports the merchant system website 134.

In an example embodiment, the POS terminal 134 comprises a computing device that is configured to accept payments from users 101, from user computing devices 110, or other parties. The POS terminal 134 may communicate, via the network, with the user computing device 110, the merchant server 133, the merchant computing device 150, the payment processing system 140, or any suitable device or system. The POS terminal 134 may comprise a barcode scanner, a user interface, a customer display, or any suitable elements to enable the salesperson 102 to initiate and conduct a transaction. The POS terminal 134 in the example embodiments may comprise a function enabling the salesperson 102 to input an indication that the transaction was conducted with the hands-free application 156 on the merchant computing device 150, and that the POS terminal 134 should consider the transaction completed.

An example payment processing system 140 comprises a payment processing system hands-free module 141 and a data storage unit 142. In an example embodiment, the user 101 has a user account with the payment processing system 140. In an example embodiment, the payment processing system hands-free module 141 manages the user account. For example, the payment processing system hands-free module 141 may receive a user's username and password and allow the user 101 to access services provided by the payment processing system 140. In an example embodiment, the payment processing system hands-free module 141 communicates with the hands-free payment application 116 resident on the user computing device 110. In another example embodiment, the payment processing system hands-free module 141 communicates with the user 101 via the user computing device web browser 114. In an example embodiment, the payment processing system hands-free module 141 manages the user's digital wallet account.

In an example embodiment, the payment processing system hands-free module 141 communicates with the merchant system 130, account issuer systems (not depicted) and/or acquirers (not depicted), or other suitable financial systems (not depicted) to process payments. In an example embodiment, the payment processing system hands-free module 141 retrieves user financial account information and credit account information from other financial institutions, from the data storage unit 142, or by communicating with the hands-free payment application 116 over the network 120. In an example embodiment, the payment processing system hands-free module 141 requests a credit authorization from an issuer system through an acquirer system and receives the credit authorization. In an example embodiment, the payment processing system hands-free module 141 initiates a bank transfer with a financial institution system. In an example embodiment, the payment processing system hands-free module 141 receives the bank transfer or completes a credit card transaction associated with the credit card authorization.

In certain example embodiments, the payment processing system hands-free module 141 creates tokens, verifies tokens, verifies rescue codes, and performs other actions as described herein. In an example embodiment, the payment processing system hands-free module 141 generates a receipt of a transaction and transmits the receipt to the user computing device 110.

In an example embodiment, the data storage unit 142 comprises any local or remote data storage structure accessible to the payment processing system hands-free module 141 suitable for storing information. In an example embodiment, the data storage unit 142 stores encrypted information, such as HTML5 local storage. In an example embodiment, the data storage unit 142 stores user financial account information and/or user credit account information.

An example merchant computing device 150 comprises a data storage unit 152, a communication application 153, a web browser 154, a user interface 155, and a hands-free payment application 156.

In an example embodiment, the data storage unit 152 comprises a local or remote data storage structure accessible to the merchant computing device 150 suitable for storing information. In an example embodiment, the data storage unit 152 stores encrypted information, such as HTML5 local storage.

In an example embodiment, the salesperson 102 uses a communication application 153, such as a web browser 154 application or a stand-alone hands-free payment application 116, to view, download, upload, or otherwise access documents or web pages via a distributed network 120.

In an example embodiment, the communication application 153 can interact with web servers or other computing devices connected to the network 120, including the merchant POS terminal 134, a web server 133 associated with a merchant system 130 and/or a payment processing system hands-free module 141.

In an example embodiment, the web browser 154 can enable the salesperson 102 to interact with web pages using the merchant computing device 150. In an example embodiment, the salesperson 102 is able to access transaction information form the POS terminal 134, and access user account information from the user computing device 110 and/or the payment processing system hands-free module 141.

In an example embodiment, the user interface 155 enables the salesperson 102 to interact with the hands-free payment application 156 and/or web browser 154. For example, the user interface 155 may be a touch screen, a voice-based interface or any other interface that allows the salesperson 102 to provide input and receive output from an application or module on the merchant computing device 150. In an example embodiment, the salesperson 102 interacts via the user interface 155 with the hands-free payment application 156 and/or web browser 154 to access a user token to conduct a transaction via the payment processing system 140.

In an example embodiment, the hands-free payment application 156 is a program, function, routine, applet, or similar entity that exists on and performs operations on the merchant computing device 150. In certain example embodiments, the salesperson 102 must install the hands-free payment application 156 and/or make a feature selection on the merchant computing device 150 to obtain the benefits of the techniques described herein. In an example embodiment, the salesperson 102 may access the hands-free payment application 156 on the merchant computing device 150 via the user interface 155. In an example embodiment, the hands-free payment application 156 may be associated with the merchant system 130. In another example embodiment, the application may be associated with the payment processing system 140. In yet another example embodiment, there are two applications 156, one associated with the merchant system 130 and another associated with the payment processing system 140.

In certain example embodiments, one or more functions herein described as performed by the hands-free payment application 156 may also be performed by a web browser 154 application, for example, a web browser 154 application associated with a merchant system website 134 or associated with the payment processing system 140. In certain example embodiments, one or more functions herein described as performed by the hands-free payment application 156 may also be performed by the merchant computing device operating system. In certain example embodiments, one or more functions herein described as performed via the web browser 154 may also be performed via the hands-free payment application 156.

In certain example embodiments, the merchant computing device 150 may be part of the merchant system 130. The merchant computing device 150 functions described herein may be performed by the merchant server 133, POS terminal 134, or other merchant device.

It will be appreciated that the network connections shown are example and other means of establishing a communications link between the computers and devices can be used. Moreover, those having ordinary skill in the art having the benefit of the present disclosure will appreciate that the user computing device 110, the merchant system 130, the POS terminal 134, the payment processing system 140, and the merchant computing device 150 illustrated in FIG. 1 can have any of several other suitable computer system configurations. For example, a user computing device 110 embodied as a mobile phone or handheld computer may or may not include all the components described above.

Figure 8:
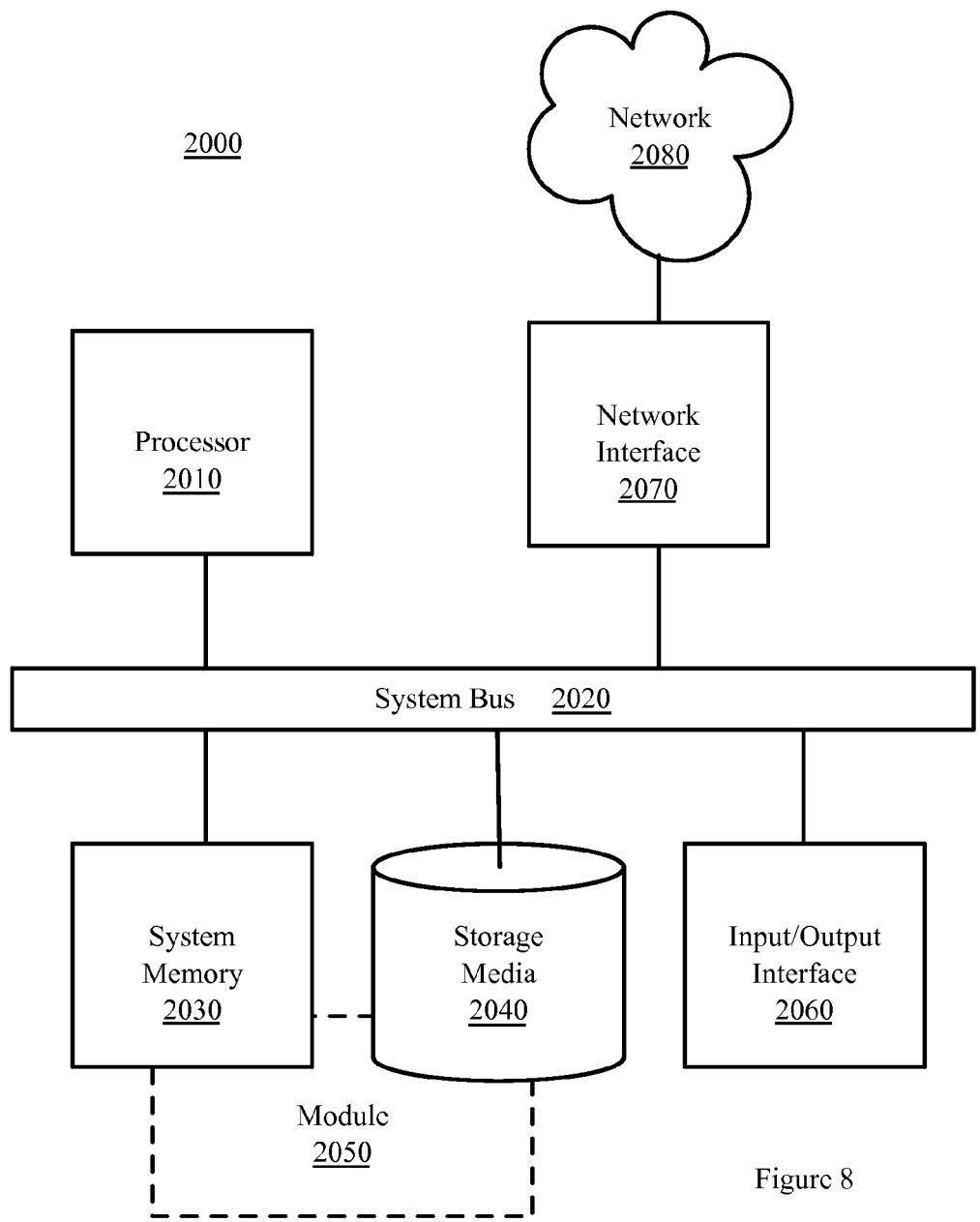
FIG. 8 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 8. Furthermore, any modules associated with any of these computing machines, such as modules described herein or any other modules (scripts, web content, software, firmware, or hardware) associated with the technology presented herein may by any of the modules discussed in more detail with respect to FIG. 8. The computing machines discussed herein may communicate with one another as well as other computer machines or communication systems over one or more networks, such as network 105. The network 105 may include any type of data or communications network, including any of the network technology discussed with respect to FIG. 8.

Example Processes

The example methods illustrated in FIGS. 2-7 are described hereinafter with respect to the components of the example operating environment 100. The example methods of FIGS. 2-7 may also be performed with other systems and in other environments.

Figure 2:
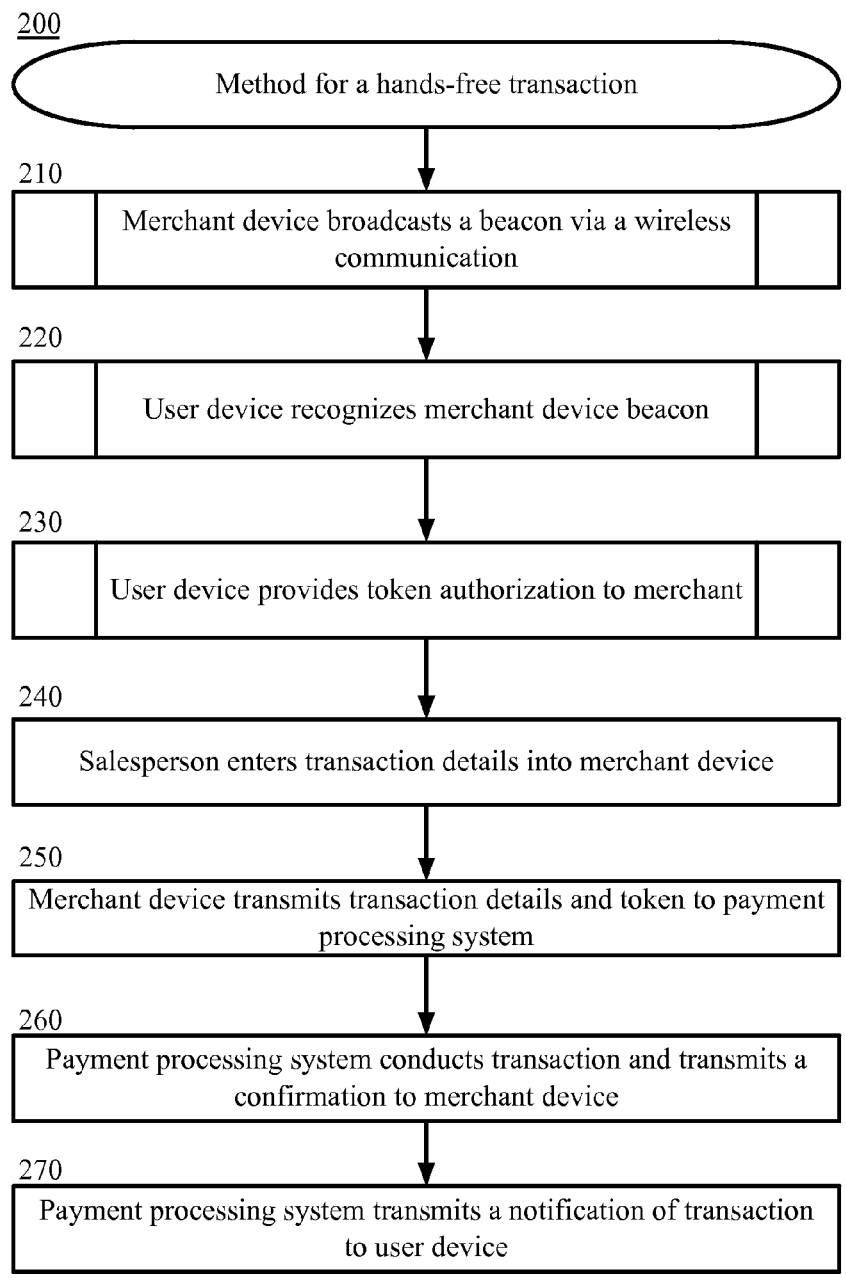
FIG. 2 is a block flow diagram depicting a method for conducting hands-free transactions, in accordance with certain example embodiments.

FIG. 2 is a block diagram depicting a method 200 for conducting a hands-free transaction, in accordance with certain example embodiments. The method 200 is described with reference to the components illustrated in FIG. 1.

In block 210, the merchant computing device 150 broadcasts a beacon via a wireless communication. Block 210 is described in greater detail hereinafter with reference to the method 210 described in FIG. 3.

Figure 3:
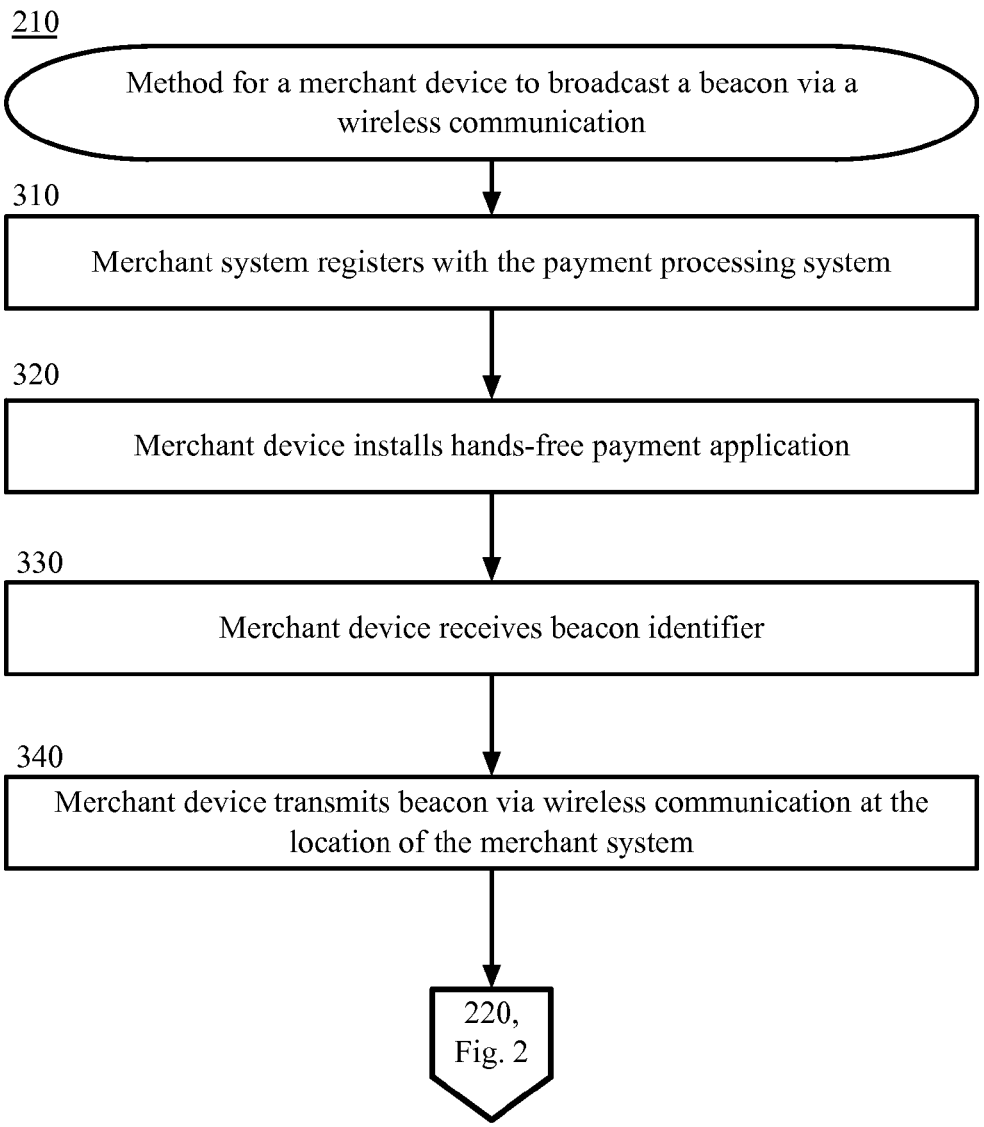
FIG. 3 is a block flow diagram depicting a method for a merchant computing device to broadcast a beacon via a wireless communication, in accordance with certain example embodiments.

FIG. 3 is a block diagram depicting a method 210 for a merchant computing device 150 to broadcast a beacon via a wireless communication, in accordance with certain example embodiments. The method 210 is described with reference to the components illustrated in FIG. 1.

In block 310, the merchant system 130 registers with the payment processing system 140. For example, the merchant system 130 may contact the payment processing system 140 to become associated with the hands-free transaction process. The merchant system 130 may obtain a merchant account, receive the appropriate applications and software, request authorization to participate, or perform any action required by the payment processing system 140.

The merchant system 130 may use the merchant computing device 150, the point of sale ("POS") terminal 134, the merchant server 133, or any suitable computing device to request and configure a merchant account. The merchant account may allow the merchant system 130 to participate in some or all of the activities described in the methods herein.

In block 320, the merchant computing device 150 installs a hands-free payment application 156. In an example, the merchant computing device 150 is registered as an authorized agent of the merchant system 130. The merchant computing device 150 may be identified by an identifier, by a provided password, a serial number, or by any suitable manner.

In an example, the merchant computing device 150 downloads the hands-free payment application 156 from the payment processing system hands-free module 141 over the network 120. The merchant computing device 150 may download the hands-free payment application 156 from the merchant system server 133. The merchant computing device 150 may obtain the hands-free payment application 156 from any suitable location. The hands-free payment application 156 on the merchant computing device 150 may be integrated into an existing account that is shared with the merchant system server 133, the POS terminal 134, or any suitable computing device or system. A salesperson 102 or another merchant system operator may be required to make a feature selection to obtain the benefits of the techniques described herein.

In block 330, the merchant computing device 150 receives a beacon identifier. For example, the hands-free payment application 156, the merchant computing device 150, the merchant system server 133, or another computing device requests a beacon identifier from the payment processing system 140. The beacon may be a wireless signal emitted by the merchant computing device 150 comprising a beacon identifier, a merchant system 130 identifier, a merchant computing device 150 identifier, or other identifier.

In an example, the beacon identifier is a service set identifier ("SSID"), or other network name or identifier. The beacon identifier may be generated by the payment processing system hands-free module 141, the merchant computing device 150, the merchant server 133, or any suitable computing device. In certain embodiments, the beacon identifier is a unique, but fixed, identifier. That is, a particular beacon identifier may be utilized until changed by the payment processing system hands-free module 141, the merchant computing device 150, the merchant server 133, or any suitable computing device. In an alternate embodiment, the beacon identifier may be unique, but random. That is, the beacon identifier may be changed randomly, or upon any suitable schedule by the payment processing system hands-free module 141, the merchant computing device 150, the merchant server 133, or any suitable computing device.

The wireless signal emitted by the merchant computing device 150 may be any suitable technology, such as Wi-Fi direct, Bluetooth, low-energy Bluetooth, infrared, or any other suitable technology, and the merchant computing device 150 may include corresponding hardware and software components to emit the beacon via the associated technology.

In block 340, the merchant computing device 150 transmits the beacon via wireless communication at the location of the merchant system 150. The merchant computing device 150 may be configured to broadcast the wireless signal at only certain times or locations, or continuously. The merchant computing device 150 may limit or extend the strength of the broadcast beacon, if needed. The beacon is receivable and recognizable by other computing devices that are within range of the wireless signal. The beacon may be transmitted on one communication technology or on a plurality of communication technologies.

In a certain example embodiment, the beacon identifier is programmed on external communication access points. The merchant hands-free application 156 may be used to configure the external communication access point(s). For example, the merchant hands-free application 156 may utilize functions of the merchant computing device 150 to communicate instructions to the external communication access points. The instructions may include the beacon identifier, the requested communication technology, the time to broadcast, and/or any other suitable instructions. The instructions may be provided by any other suitable computing device.

The external communication access points may be employed to allow a variety of user computing devices 110 to receive the beacon despite differing wireless communication technology capabilities or in various locations in the merchant location. The external communication access points may allow the beacon to be broadcast over a wider area than the merchant computing device 150 alone is capable of broadcasting.

From block 340, the method 210 proceeds to block 220 of FIG. 2.

Returning to FIG. 2, in block 220, the user computing device 110 recognizes the merchant computing device beacon. Block 220 is described in more detail hereinafter with reference to the method 220 described in FIG. 4.

Figure 4:
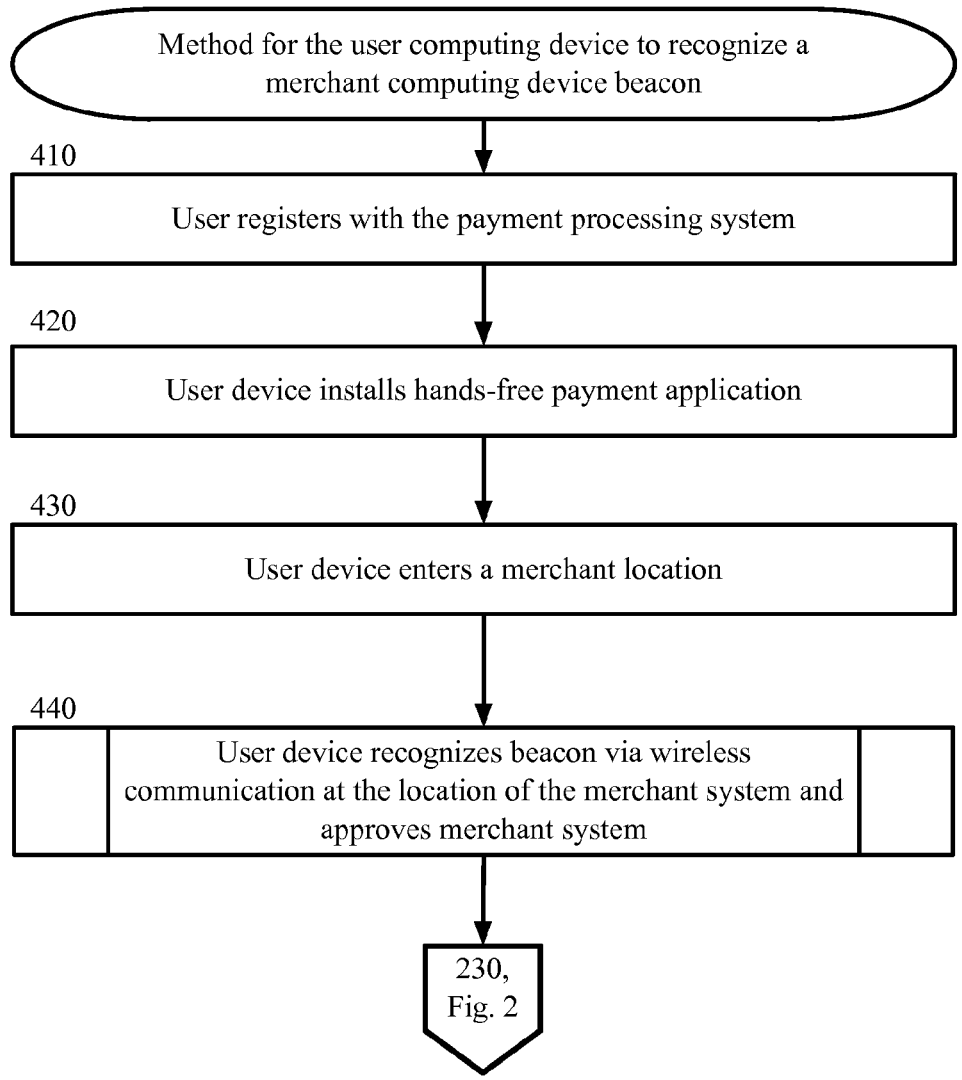
FIG. 4 is a block flow diagram depicting a method for a user computing device to recognize a merchant computing device beacon, in accordance with certain example embodiments.

FIG. 4 is a block diagram depicting a method 220 for the user computing device 110 to recognize the merchant computing device beacon, in accordance with certain example embodiments. The method 220 is described with reference to the components illustrated in FIG. 1.

In block 410, the user 101 registers with the payment processing system 140. For example, the user 101 may contact the payment processing system 140 to register a user account. The user 101 may obtain a user account number, receive the appropriate applications and software to install on the user computing device 110, request authorization to participate in the hands-free payment processing, or perform any action required by the payment processing system 140. The user 101 may utilize the functions of the user computing device 110, such as the user interface 115 and the web browser 114, to register and configure a user account.

In block 420, the user computing device 140 installs a hands-free payment application 116. For example, the user computing device 110 downloads the hands-free payment application 116 from the payment processing system hands-free module 141 over the network 120. The user computing device 110 may obtain the hands-free payment application 116 from any other suitable location. The hands-free payment application 116 on the user computing device 110 may be configured with the user account information, user preferences, or other suitable information. A user 101 may be required to make a feature selection to obtain the benefits of the techniques described herein.

The hands-free payment application 116 may provide options, data, configurable alerts, and other suitable benefits to the user 101. For example, the hands-free payment application 116 may comprise a listing of participating merchant systems 130 and merchant locations. The listing may be updated periodically from the payment processing system 140. The hands-free payment application 116 may notify the user 101 when the user 101 is within a configured vicinity of a participating merchant system 130. The hands-free payment application 116 may provide the user 102 with options to update payment preferences. The hands-free payment application 116 may provide the user 101 with a listing of recent transactions. The hands-free payment application 116 may provide any other suitable information to the user 101.

In block 430, the user computing device 110 enters a location of the merchant system 130. The user 101 may enter the merchant location carrying the user computing device 101 in a pocket or a bag, in the hands of the user 101, or in any suitable manner. The location of the merchant system 130 may be a store location, a kiosk location, or any suitable physical location of a merchant system 130. In an alternate example, a salesperson 102 may be mobile and arrive at a location of the user 101. For example, the merchant system 130 may be a restaurant and the salesperson 102 may be a delivery person possessing a merchant computing device 150.

In certain example embodiments, the hands-free payment application 116 alerts the user 101 when the user 101 is in the vicinity of a merchant system 130 that accepts hands-free payments. The alert may be provided via a message on the user computing device 110, via an email or a text, or in any suitable manner.

The alert may be based on the location of the user 101 as determined by the GPS module 118. For example, the hands-free payment application 116 accesses the GPS data from the GPS module 118 and compare the GPS location to a list of locations of merchant systems 130 that accept hands-free payments. If a match results from the comparison, then an alert is generated and provided to the user. The match may result if the user 101 is within a configured distance of the merchant system 130.

The alerts may be configured to alert in any suitable manner. In an example, the alerts may be combined in commercially dense environment or the alerts may be presented individually. In another example, the alerts may be configured to only alert the user 101 a configured number of times. For example, the alert may be presented three times, but upon a fourth instance, the alert is not presented. The alerts may be presented as a notification with an audible alert, a vibration, a popup alert on the user interface 115 of the user computing device 110, or other suitable alert.

In block 440, the user computing device 110 recognizes a beacon via wireless communication at the location of the merchant system 130 and approves the merchant system 130. Block 440 is described in more detail hereinafter with reference to the methods 440a and 440b described in FIGS. 6 and 7.

Figure 6:
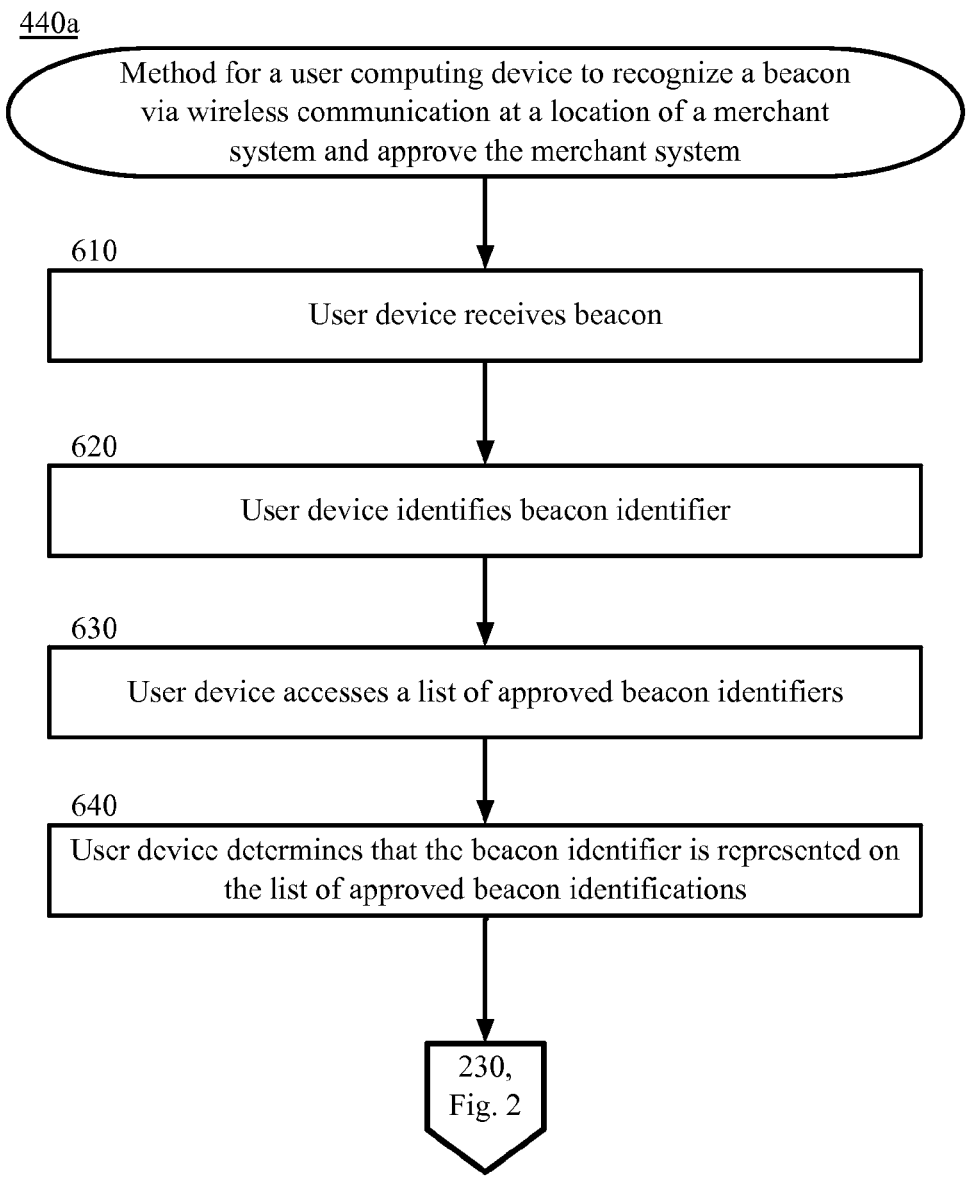
FIG. 6 is a block flow diagram depicting a method for a user computing device to recognize a beacon via wireless communication at a location of a merchant system and approve the merchant system, in accordance with certain example embodiments.

FIG. 6 is a block flow diagram depicting a method 440a for a user computing device 110 to recognize a beacon via wireless communication at a location of a merchant system and approve the merchant system, in accordance with certain example embodiments. The method 440a is described with reference to the components illustrated in FIG. 1. In certain embodiments, some or all of the blocks of the method 440a are performed by the payment processing system 140. For example, the beacon identifier and other suitable data are transmitted to the payment processing system 140 for analysis and verification.

In block 610, the user computing device 110 receives the beacon. The user computing device 110 may be configured to search for beacons or other wireless signals. Upon entering the range of the broadcast of the merchant computing device 150, the user computing device 110 receives the beacon. The user computing device 110 may search for a beacon continuously, when instructions to begin searching for the beacon are received from the user 101, when the location of the user computing device 110 dictates a beacon is near, or at any suitable time. In an example, the user computing device 110 may provide an alert that a merchant system 130 at the location of the user computing device 110 is listed on a database as a participant in the hands-free transaction program. Upon recognizing that the a merchant system 130 is listed on the database as a participant in the hands-free transaction program, the user computing device 110 may begin a search for beacons or provide a recommendation to the user 101 that a search should be conducted.

When the user computing device 110 receives the beacon, the user computing device 110 determines the communication technology being used and stores the data associated with the beacon. The data may be stored on the data storage unit 112 or in any suitable location. In certain embodiments, the user computing device 110 transmits the beacon data to the payment processing system 140 and, the payment processing system 140 conducts some or all of the remaining steps of the method 440a.

In block 620, the user computing device 110 identifies the beacon identifier. The user computing device 110 interprets the data transmitted in the beacon and recognizes that the beacon is associated with the payment processing system 140 and/or the hands-free payment application 116 based on the data in the beacon. In an example, the hands-free payment application 116 extracts data from the beacon, such as a beacon identifier, a merchant system 130 name, communication technology requirements, or any other suitable information.

The user computing device 110 locates the beacon identifier in the beacon data via any suitable method. For example, the user computing device 110 may analyze the content and extract the beacon identifier based on the location of the identifier within the data, based on instructions from the merchant computing device 150, based on instructions within the data identifying the location, based on an industry standard, or based on any other suitable method.

In block 630, the user computing device 110 accesses a list of approved beacon identifiers. The list may comprise beacon identifiers that are approved by the payment processing system 140, by the user 101, by a financial institution that issued a payment account to the user 101, or by any other suitable party. Additionally, the list may be composed by one party and revised or limited by another party. The list may be stored on the data storage unit 112, on the payment processing system 140, cloud computing environment, or any suitable storage location. The user computing device 110 may access the list in any suitable manner, such as over the network 120.

In block 640, the user computing device 110 determines that the beacon identifier is represented on the list of approved beacon identifications. The user computing device 110 may compare the data from the beacon to the database of beacon data to determine an identity of the merchant system 130 associated with the beacon and to verify the authenticity of the beacon. If the beacon identifier is listed on the database as a verified beacon identifier associated with a verified merchant system 130, then the method 440a may proceed. In certain embodiments, the user computing device 110 may use a prefix, a suffix or some regular expression to determine if the beacon identifier is potentially a valid identifier. The user computing device 110 device may communicate with the payment processing system 140 to further verify the authenticity of the beacon based on regular expression.

In certain example embodiments, the hands-free payment application 116 has received a list of one or more merchant systems 130 with which the user 101 does not wish to conduct hands-free transactions. If the hands-free payment application 116 identifies the merchant system 130 on the list, then the hands-free payment application 116 will not respond to the beacon identifier. In this case, hands-free payment application 116 may end any wireless communication with the payment processing system 140 and/or with the merchant computing device 150 and not provide any response or acknowledgement to the merchant computing device 150 while the user computing device 110 is at the location of the merchant system 130. Additionally or alternatively, the payment processing system 140 cease responding or acknowledging the merchant computing device 150.

The list may be populated by the user 101, the payment processing system 140, or any suitable party. In an example, a user 101 adds a merchant system 130 to the list based on a previous experience, because the merchant system 130 does not appear trustworthy, or for any suitable reason.

If the payment processing system 140, in an alternate embodiment, performed some or all of the blocks of method 440a, then the payment processing system 140 transmits the determination that the beacon identifier is represented on the list of approved beacon identifications to the user computing device 110.

From block 640, the method 440a proceeds to block 230 of FIG. 2.

An alternate embodiment of block 440 of FIG. 4 is explained in greater detail in the method 440b of FIG. 7.

FIG. 7 is a block flow diagram depicting a method 440b for a user computing device 110 to recognize a beacon via wireless communication at a location of a merchant system 130 and approve the merchant system 130 using location data, in accordance with certain example embodiments. The method 440b is described with reference to the components illustrated in FIG. 1. In certain embodiments some or all of the blocks of the method 440b are performed by the payment processing system 140. For example, the beacon identifier, the location data, and other suitable data are transmitted to the payment processing system 140 for analysis and verification.

Blocks 610 and 620 of FIG. 7 are substantially similar to Blocks 610 and 620 of FIG. 6 as described previously herein.

In block 730, the user computing device 110 accesses a list of approved beacon identifiers and merchant system locations. The list may comprise beacon identifiers and locations of merchant systems 130 that are approved by the payment processing system 140, by the user 101, by a financial institution that issued a payment account to the user 101, or by any other suitable party. Additionally, the list may be composed by one party and revised or limited by another party. The list may be stored on the data storage unit 112, on the payment processing system 140, cloud computing environment, or any suitable storage location. The user computing device 110 may access the list in any suitable manner, such as over the network 120. In certain embodiments, the payment processing system 140 will access the list upon receiving the beacon identifier and other data from the user computing device 110.

The locations of the merchant systems 130 are associated with the beacon identifiers that are associated with the merchant systems 130. For example, a particular merchant system 130 would be identified with a particular beacon identifier and a particular location in the database. The location may be stored as a longitude and latitude, a street address, or any suitable location identification. The locations may be provided by the merchant system 130, obtained from mapping programs, input by payment processing system 140 operators, or provided by any suitable source. In certain embodiments, the locations of the merchant systems 130 are in the same database with the beacon identifiers. In alternate embodiments, the locations of the merchant systems 130 are in a second database.

In block 740, the user computing device 110 determines the location of the user 101. For example, the user computing device 110 uses the GPS module 118 of the user computing device 110 to determine the location. In the example, the GPS module 118 communicates with one or more satellites of the Global Positioning System ("GPS") or other satellite-based location system to determine the location of the user computing device 110. In an example embodiment, the delivery system 140 periodically or continuously communicates with the GPS module 118 during applicable time periods to determine and log the location of the user computing device 110. In another embodiment, the location of the user computing device 110 is identified based on Wi-Fi signals, cellular location, or any suitable location identifying technology. Any location determining hardware, software, or combination of hardware and software is represented by the GPS module 118.

After determining the location, the user computing device 110 stores the location for comparison with the merchant system database. In certain embodiments, the user computing device 110 transmits the determined location to the payment processing system 140 to compare to the database.

In block 750, the user computing device 110 determines if a location of the user computing device 110 matches an expected location of the merchant system 130 based on the location associated with the beacon identifier in the database. The user computing device 110 compares the stored location of the user computing device 110 to the location of the merchant system 130 associated with the beacon identifier. For example, the user computing device 110 locates the beacon identifier in the database and identifies the merchant system 130 associated with the beacon identifier. The user computing device 110 then identifies the location of the merchant system 130 from the database. The identified location is compared to the location received from the user computing device 110.

If the locations are identical or within a configured distance of each other, then a location match is identified. For example, if the locations are determined to be less than 100 feet apart, then a match is identified. If the locations are greater than 100 feet apart, then a match is not identified. Any suitable distance, such as 10 feet, 100 feet, or 500 feet, may be used.

In certain embodiments, the payment processing system 140 determines if a location of the user computing device 110 matches an expected location of the merchant system 130 based on the location associated with the beacon identifier in a similar manner.

In block 760, if the locations match, then the user computing device 110 determines that the beacon identifier is represented on the list of approved beacon identifications. If no match is identified, then the beacon is not verified as an approved beacon from an approved merchant system 130. If the beacon identifier is verified, then the method 440b may proceed. In certain embodiments, the payment processing system 140 determines that the beacon identifier is represented on the list of approved beacon identifications in a similar manner.

If the payment processing system 140 identified the match, then the payment processing system 140 transmits the match to the user computing device 110 so that the user computing device 110 may proceed to create a token.

From block 760, the method 440b returns to block 230 of FIG. 2.

Returning to FIG. 2, in block 230, the user computing device 110 provides token authorization to the merchant system 130. Block 230 is described in greater detail in the method 230 of FIG. 5.

Figure 5:
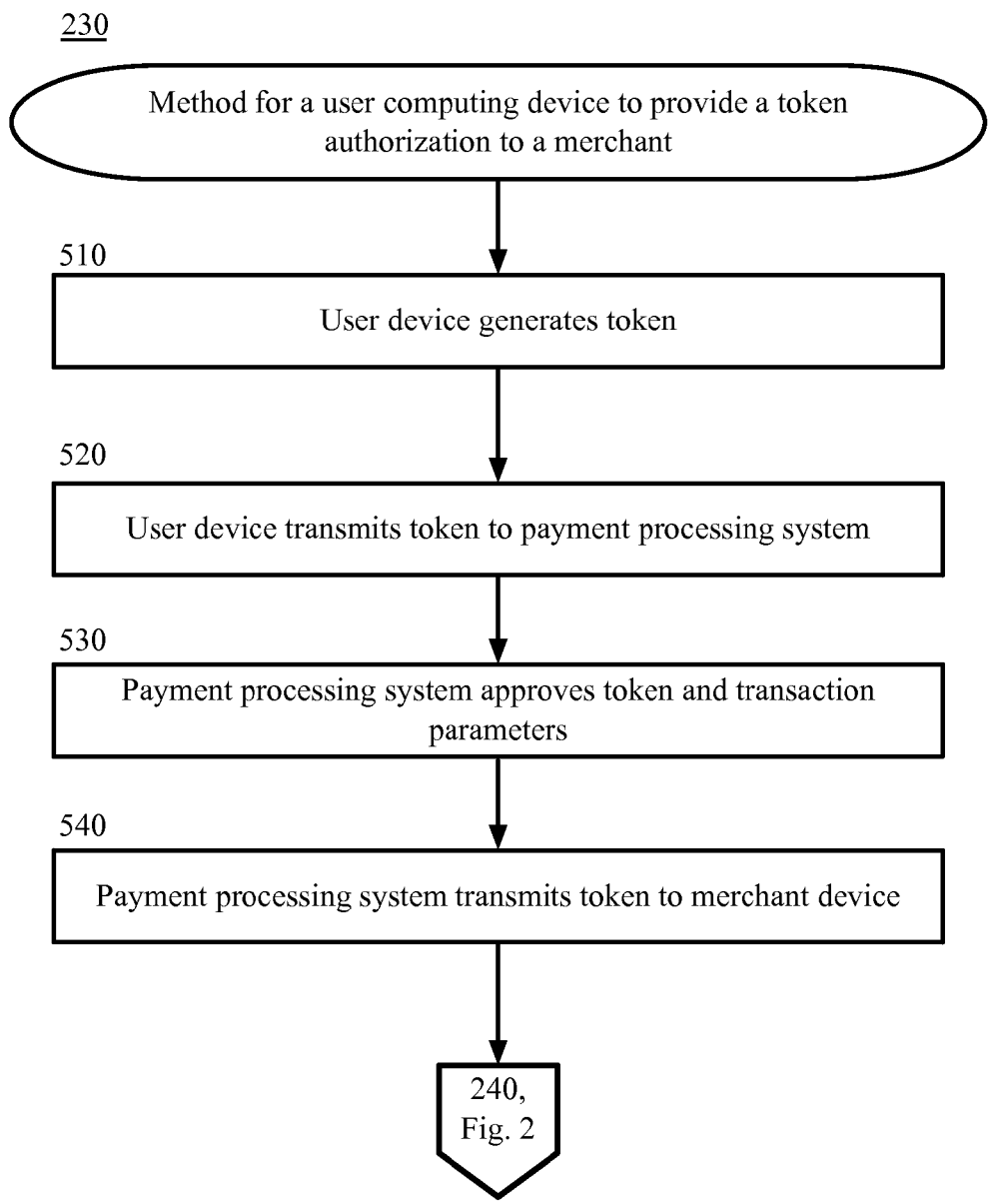
FIG. 5 is a block flow diagram depicting a method for a user computing device to provide a token authorization to a merchant, in accordance with certain example embodiments.

FIG. 5 is a block flow diagram depicting a method 230 for a user computing device 110 to provide a token authorization to the merchant system 130, in accordance with certain example embodiments. The method 230 is described with reference to the components illustrated in FIG. 1.

In block 510, the user computing device 110 generates a token for a potential transaction. The token may be any data associated with the user account that is generated by the user computing device 110 for secure transmission to another computing device. The token may represent an authorization or acknowledgement by the user computing device 110 that the user computing device 110 is in communication with a merchant computing device 110 and that a transaction may be forthcoming. The token may comprise a user account identifier, the beacon identifier, a user computing device 110 identifier, or any suitable data. The token may be encrypted or otherwise configured to only be readable by one or more of the payment processing system hands-free module 141, the user computing device 110, a financial account server associated with the payment processing system 140, or any suitable computing system.

In certain example embodiments, the token, or certain portions of the token, is not readable by the merchant computing device 150. To generate the token, the user computing device 110 may compile all of the data needed for the token into a data file and insert identifiers, labels, or other items to prepare the token for transmission. The token may provide a time that the token will expire. For example, the token may only be usable for one hour after being generated. In the example, after the one hour has elapsed, the token is no longer valid for use and the payment processing system 140 will reject any transaction request including an expired token. In certain example embodiments, the token comprises the beacon identifier, the location of the user computing device 110, the user account identifier, or any other suitable data.

The token may be generated by the hands-free application 116, or another application module or component of the user computing device 110. For example, an application executing on a secure element or other secure memory of the user computing device 110 may generate the token. The token may be generated in response to receiving the beacon from the merchant computing device 150. That is, the token is not generated until the user computing device 110 recognizes the beacon and recognizes a need to transmit the token based on the identify of the merchant system 130, the location of the user computing device 110, or any other factors. In an alternate embodiment, the token is created in advance. The token, or a series of tokens, may be created and stored on the data storage unit 112 of the user computing device 110. The token may be accessed from the storage location and utilized when requested by the hands-free payment application 116.

In certain embodiments, a token is not generated by the user computing device 110. For example, the payment processing system 140 may generate the token. The payment processing system 140 may receive, from the user computing device 110, a set of authentication data for the user account and generate a token. The authentication data may comprise user 101 data, account data, passwords, user computing device 110 data, or any suitable data that may be used to authenticate the user account. The authentication data may be transmitted to the payment processing system 140 when the user computing device 110 receives the beacon from the merchant computing device 150. The user computing device 110 may access the authentication data from a database on the data storage unit 112, or from data stored in the hands-free payment application 116. The authentication data is transmitted in a similar fashion as the description of the transmission of the token from the user computing device 110 to the payment processing system 140. The token that is generated by the payment processing system 140 is transmitted back to the user computing device 110 or to the merchant computing device 150 on behalf of the user computing device 110.

In block 520, the user computing device 110 transmits the token to the payment processing system 140. The user computing device 110 may transmit a new token at the time that the user computing device 110 recognizes the beacon and the beacon identifier, at a time that a previous token has expired, or upon any suitable schedule. The user computing device 110 may transmit the token via an Internet communication over the Internet, Bluetooth communication, Wi-Fi communication, cellular connection, or via any suitable communication protocol.

In block 530, the payment processing system hands-free module 141 approves the token and transaction parameters. The payment processing system hands-free module 141 receives the token and any associated information from the user computing device 110 and determines if the beacon identifier can be verified.

The verification may be similar to the methods of the user computing device 110 to verify the beacon identifier in the method 440a in FIG. 6 or method 440b in FIG. 7. For example, the payment processing system hands-free module 141 may compare the beacon identifier to a database to determine if the beacon identifier is registered and approved. The payment processing system hands-free module 141 may compare a location of the user computing device 110, as determined by the global positioning system ("GPS") module 118, to a database of locations associated with the beacon identifiers. If not provided already, the payment processing system hands-free module 141 may request the GPS location of the user computing device 110 in a communication over the network 120 and receive a response from the user computing device 110. If the location of the user computing device 110 matches the expected location of the merchant computing device 150, then the token is verified. Any other suitable criteria for verifying the token may be employed.

The payment processing system hands-free module 141 may verify the user account on the payment processing system 140 to determine if the user account is active and available for transactions. For example, the payment processing system may access the user account and determine if the account has funds available for use as stored value funds, or if the account has a valid credit or debit account associated with the account with which to conduct transaction.

In block 540, the payment processing system hands-free module 141 transmits the token to a merchant computing device 150. If the token is verified, the payment processing system hands-free module 141 communicates the token to the merchant computing device 150 to allow a hands-free transaction to be conducted. The token provides the merchant computing device 150 with the authorization to initiate a transaction on behalf of the user account. In an example embodiment, the token is transmitted to the merchant computing device 150 upon the detection by the user computing device of the beacon. Thus, he token is transmitted to the merchant computing device 150 before a transaction is initiated by the merchant computing device 150 or the user computing device 110.

In an alternate embodiment, the user computing device 110 provides the token directly to the merchant computing device 150. For example, the user computing device 110 generates the token as described in block 510 and transmits the token to the merchant computing device 150 instead of to the payment processing system 140. In a certain embodiment, the user computing device 110 may require approval from the payment processing device 140 before transmitting the token to the merchant computing device 150.

Alternatively, the user computing device may transmit authorization data to the payment processing system. The authentication data may comprise user 101 data, account data, passwords, user computing device 110 data, or any suitable data that may be used to authenticate the user account. The authentication data may be transmitted to the payment processing system 140 when the user computing device 110 receives the beacon from the merchant computing device 150. The user computing device 110 may access the authentication data from a database on the data storage unit 112, or from data stored in the hands-free payment application 116. The authentication data is transmitted in a similar fashion as the description of the transmission of the token from the user computing device 110 to the payment processing system 140. The token that is generated by the payment processing system 140 is transmitted back to the user computing device 110. The user computing device 110 then transmits the received token to the merchant computing device 150.

From block 540, the method 230 returns to block 240 of FIG. 2.

In block 240, the salesperson 102 enters transaction details into the merchant computing device 150. In an example, the user 101 selects a product for purchase at the location of the merchant system 130. The term "product" includes tangible and intangible products, as well as services. The salesperson 102 scans the product with a barcode scanner or in any suitable manner enters the product details into the merchant computing device 150. The transaction data may include the product identification, the product price, quantity of products, merchant location, merchant identification, or any other suitable information.

In block 250, the merchant computing device 150 transmits the transaction details and the token to the payment processing system hands-free module 141. The salesperson 102 selects the appropriate token. In an example, only one token is available for selection. In another example, the token is associated with the user 101 when the user 101 enters the merchant location and the token is received. In another example, the token is identifiable as being associated with the user 101 based on an identifier of the user 101, such as a picture.

In the example, the merchant computing device 150 has received and stored one or more tokens associated with one or more user accounts. The merchant computing device 150 identifies user account information associated with the tokens. The information may be provided by the token or by a communication with a database associated with the token.

In another example, the user account information may have been provided to the merchant computing device 150 with a previous token or in a previous transaction. The user account information and/or the tokens are displayed to the salesperson 102 to allow the salesperson 102 to select the appropriate token or user account. The salesperson 102 identifies the user account or token and associates the user account with the product being purchased by the user 101. The user account may be represented to the salesperson 102 by a picture of the user 101, by a name of the user 101, by a configured alias, or by any suitable identifier of the user 101 or the user account.

The salesperson 102 provides an indication on the user interface 155 of the merchant computing device 150 that the user 101 has agreed to the purchase transaction. The user 101 may agree to the transaction by verbally informing the salesperson 102, or by any other suitable method. The salesperson 102 may select on the user interface the transaction details, the token, the user account, and other data and associate the data with the transaction request. The data is associated by the merchant computing device 150 and a transaction request is prepared, such as by entering the data on the appropriate entry blocks on a transaction request template.

The merchant computing device 150 transmits the transaction details and the token to the payment processing system 140 to conduct the transaction. The transaction details may be the identification of the product or products to be purchased, the total price, the merchant identification, or any other suitable details.

In block 260, the payment processing system 140 conducts the transaction and transmits a confirmation to merchant computing device 150. The payment processing system hands-free module 141 receives the transaction details and the token from the merchant computing device 150 and processes the transaction. The payment processing system hands-free module 141 verifies the token as the same token that was previously received from the user computing device 110 (or generated by the payment processing system hands-free module 141) and provided to the merchant system computing device 150. If the token is not verified as the same token, then the transaction does not proceed. If the token is not verified, the payment processing system hands-free module 141 may request the correct token from the merchant system computing device 150, decline the transaction, alert a payment processing system hands-free module 141 operator, or perform any suitable action to complete or cancel the transaction.

Upon a verification of the token, the payment processing system hands-free module 141 determines if the user account has the funds available for the transaction. In an example, the payment processing system hands-free module 141 may apply the transaction by deducting the amount of the transaction from a pool of funds stored in the user account. In another example, the payment processing system hands-free module 141 may provide an authorization request to a financial account issuer, such as a credit or debit card, associated with the account. Upon receiving an authorization from the financial account issuer, the payment processing system hands-free module 141 proceeds with the transaction. The user account may be funded by any other suitable source, such as a bank account, a stored value account, a debit card, or any suitable source. The payment processing system hands-free module 141 debits the appropriate account of the user 101 for the amount of the transaction and credits an account of the merchant for the amount of the transaction.

The payment processing system hands-free module 141 provides a notification to the merchant system computing device 150 that the transaction is authorized. The authorization may be presented to the salesperson 102 by the user interface 155 of the merchant computing device 150. Upon receiving the authorization, the salesperson 102 may provide the product and a receipt to the user 101 or the user computing device 110. Upon settlement of the transaction, the payment processing system hands-free module 141 provides the funds for the transaction to the merchant system 130.

In block 270, upon a successful conducting of the transaction, the payment processing system 140 transmits a notification of the successful completion of the transaction to the user computing device 110. The notification provides the details of the transaction, such as the transaction amount, the product purchased, and other suitable details. The notification allows the user 101 an opportunity to quickly dispute the charge. For example, the salesperson 102 or the merchant computing device 150 may have associated the wrong token with the transaction details. In another example, the transaction details were in error and an incorrect amount was deducted from the user account. The user 101 receives the notification on the user computing device 110 and views the transaction details on the user interface 115. In an alternate example, the user 101 receives the notification from the payment processing system 140 as an email, a text, as a notification on the hands-free payment application, or in any suitable manner. In an alternate embodiment, the notification may be provided by the merchant computing device 150. For example, the merchant computing device 150 provides a text to the user computing device with the transaction details.

The notifications, receipts, and other transaction data may be stored in a list on a database or other storage system on the user computing device 110, the hands-free payment application 116, or any suitable storage location. The notifications, receipts, and other transaction data may be stored in a list on a user account or other location on the payment processing system 140. The user 101 may access the list to review recent transactions, to seek refunds, or for any suitable reason. In certain examples, the list on the user computing device 110 may synchronize with the list on the payment processing system 140 either automatically or when prompted by the user 101.

All refunds for transactions may be conducted through the hands-free application 116. The user 101 initiates the hands-free application at the location of the merchant 130. The user 101 presents a transaction identification from a notification or a receipt to complete the refund. For example, the user 101 selects a notification from a recent transaction that has been transmitted to the user computing device 110. The user 101 may select a receipt for a recent transaction from the notification, from a text from the merchant computing device 150, or from any suitable provider. The user 101 may either present the receipt or notification via the hands-free application 116, an email receipt, or a print out of the email receipt.

To obtain a refund, a user 101 opens a list of completed transactions on the hands-free application 116 and selects the desired receipt. Additionally, the user 101 may manually enter the transaction identification, or scan a QR code on the receipt displayed on the hands-free application to obtain data from a particular transaction. The user 101 may access a list of recent transactions on the user computing device 110. The list may be displayed on the user interface 115 with control objects for selecting a transaction. The user computing device 110 may receive an input of a selection from the user 101 and transmit the details of the selected transaction to the merchant system computing device 150.

Once selected, a full or partial amount can be refunded to the user account. The merchant system 130 may transfer the refund amount to the payment processing system 140 for deposit into the user account. The funds may alternatively be transmitted by the merchant system 130 or the payment processing system 140 to a credit card account or other account associated with the user account. Any other refund method may be employed. The transaction history and receipt in the user account will reflect the full or partial refund.

If a user 101 desires to dispute a charge, the user 101 opens the hands-free application 116 and selects an option to dispute a transaction that has been conducted with the user account. The hands-free application 116 transmits a notification to the payment processing system hands-free module 141. An operator at the payment processing system 140 may contact the user 101 to resolve the issue. The hands-free application 116 may further transmit the transaction identification or other transaction details to the payment processing system hands-free module 141.

Other Example Embodiments

FIG. 8 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain example embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to conduct automatic, hands-free transactions by transmitting transaction tokens to merchant computing systems based on beacon identifiers and transaction tokens received from user computing devices, comprising:

generating, by the payment processing computing system, a beacon identifier associated with a merchant computing system;

communicating, by the payment processing computing system, the beacon identifier to a merchant computing system computing device associated with the merchant computing system;

receiving, by the payment processing computing system, an automatic communication from a hands-free payment application on a user computing device, the communication comprising a transaction token, an identification of a user account associated with a user, and the beacon identifier;

verifying, by the payment processing computing system, the transaction token, wherein the transaction token is verified by comparing the received beacon identifier to a list of approved beacon identifiers;

transmitting, by the payment processing computing system, the transaction token to the merchant computing system computing device associated with the beacon identifier;

after transmitting the transaction token to the merchant computing system computing device, receiving, by the payment processing computing system, from the merchant computing system computing device, a transaction request, the transaction request comprising the transaction token and transaction data associated with a purchase transaction;

verifying, by the payment processing computing system, that the transaction token received from the merchant computing system computing device matches the transaction token received from the a-hands-free payment application on the user computing device; and based on the matched transaction token, authorizing, by the payment processing computing system, the transaction between the user account and the merchant computing system based on the received transaction token and transaction request.

2. The computer-implemented method of claim 1, further comprising providing, by the payment processing computing system, the hands-free payment application to the user computing device and the merchant computing device.

3. The computer-implemented method of claim 1, wherein the transaction token comprises a time after which the transaction token is not usable in a transaction, and the method further comprises verifying, by the payment processing computing system, that a current time is not later than the time after which the transaction token is not usable in a transaction.

4. The computer-implemented method of claim 1, further comprising conducting, by the payment processing computing system, the transaction with the user account based on the authorizing of the transaction.

* * * * *